United States Patent
Subrahmanyam et al.

(10) Patent No.: US 10,198,352 B2
(45) Date of Patent: Feb. 5, 2019

(54) EFFICIENT POINTER SWIZZLING FOR PERSISTENT OBJECTS

(71) Applicant: VMware, Inc., Palo Alto, CA (US)

(72) Inventors: Pratap Subrahmanyam, Saratoga, CA (US); Zongwei Zhou, Mountain View, CA (US); Rajesh Venkatasubramanian, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 94 days.

(21) Appl. No.: 15/192,946

(22) Filed: Jun. 24, 2016

(65) Prior Publication Data
US 2017/0344475 A1 Nov. 30, 2017

Related U.S. Application Data

(60) Provisional application No. 62/343,462, filed on May 31, 2016.

(51) Int. Cl.
*G06F 12/06* (2006.01)

(52) U.S. Cl.
CPC .. *G06F 12/0646* (2013.01); *G06F 2212/1008* (2013.01)

(58) Field of Classification Search
CPC ............. G06F 11/1438; G06F 11/1471; G06F 12/0238; G06F 2009/45583; G06F 3/0644
See application file for complete search history.

(56) References Cited

U.S. PATENT DOCUMENTS

| | | | |
|---|---|---|---|
| 6,718,538 B1* | 4/2004 | Mathiske | G06F 11/1438 714/E11.13 |
| 2002/0103814 A1* | 8/2002 | Duvillier | G06F 17/30356 |
| 2002/0103819 A1* | 8/2002 | Duvillier | G06F 17/30356 |
| 2003/0229766 A1* | 12/2003 | Dice | G06F 12/0261 711/154 |

(Continued)

OTHER PUBLICATIONS

N. Shasha and S. Toledo, "Storing a Persistent Transactional Object Heap on Flash Memory," Software—Science, Technology & Engineering, 2007. SwSTE 2007. IEEE International Conference on, Herzlia, Israel, 2007, pp. 66-76.*

(Continued)

*Primary Examiner* — Prasith Thammavong
*Assistant Examiner* — Alex G Olson

(57) ABSTRACT

Techniques for efficiently swizzling pointers in persistent objects are provided. In one embodiment, a computer system can allocate slabs in a persistent heap, where the persistent heap resides on a byte-addressable persistent memory of the system, and where each slab is a continuous memory segment of the persistent heap that is configured to store instances of an object type used by an application. The system can further store associations between the slabs and their respective object types, and information indicating the locations of pointers in each object type. At the time of a system restart or crash recovery, the system can iterate through each slab and determine, based on the stored associations, the slab's object type. The system can then scan though the allocated objects in the slab and, if the system determines that the object includes any pointers based on the stored pointer location information, can swizzle each pointer.

21 Claims, 3 Drawing Sheets

(56) References Cited

U.S. PATENT DOCUMENTS

2004/0168030 A1* 8/2004 Traversat ............ G06F 9/45504
711/133
2010/0131721 A1* 5/2010 Title ........................ G06F 21/51
711/154

OTHER PUBLICATIONS

Jian Xu et al, "NOVA: A Log-structured File System for Hybrid Volatile/Non-volatile Main Memories", Feb. 22, 2016, 17 pages, Santa Clara, CA.

* cited by examiner

EFFICIENT POINTER SWIZZLING FOR PERSISTENT OBJECTS

CROSS-REFERENCE TO RELATED APPLICATIONS

This application claims priority to U.S. Provisional Patent Application No. 62/343,462, filed May 31, 2016, entitled "Efficient Pointer Swizzling for Persistent Objects," which is incorporated by reference in its entirety for all purposes.

BACKGROUND

Traditional in-memory applications, such as in-memory databases and key-value stores, store data and metadata in volatile memory for fast access and persist the data/metadata to nonvolatile storage on a periodic basis to avoid data loss in the case of a system restart, crash, or failure. With this approach, the data/metadata structures (i.e., objects) maintained in volatile memory generally need to be serialized when persisting the data/metadata to nonvolatile storage and de-serialized when reconstructing the data/metadata in volatile memory during a system restart or crash recovery. These serialization and de-serialization processes can be time-consuming and compute intensive.

With the development of byte-addressable persistent memory technologies such as phase change memory (PCM), nonvolatile DIMMs (NVDIMMs), and the like, it is now possible for in-memory applications to both access and persist their data/metadata objects directly from/to such persistent memory. Due to the speed and nonvolatile nature of byte-addressable persistent memory, this approach enables in-memory applications to achieve throughput and latency performance that is similar to using volatile memory, while at the same time avoiding the need to write out their data/metadata to disk (thereby eliminating the serialization and de-serialization described above).

Typically, the process of using byte-addressable persistent memory as a direct object store for an in-memory application involves carving out a persistent heap in the byte-addressable persistent memory and mapping the persistent heap to a virtual address space of the application. This allows the application to read and write objects from/to the persistent heap using direct memory operations. However, in some cases, the computer system on which the application runs may randomize the base virtual memory address of the persistent heap after each system or application restart for, e.g., security purposes. In other cases, the application may be brought up on a different computer system that uses a different virtual memory layout. In these and other similar scenarios, any memory pointers included in the objects in the persistent heap will become invalid upon system restart/recovery because the persistent heap will be mapped to a different virtual address range. Accordingly, there is a need to identify all of these pointers and "swizzle," or convert, the pointers based on the new memory mapping so that they can be correctly de-referenced at runtime.

SUMMARY

Techniques for efficiently swizzling pointers in persistent objects are provided. In one embodiment, a computer system can allocate slabs in a persistent heap, where the persistent heap resides on a byte-addressable persistent memory of the system, and where each slab is a continuous memory segment of the persistent heap that is configured to store instances of an object type used by an application. The system can further store associations between the slabs and their respective object types, and information indicating the locations of pointers in each object type. At the time of a system restart or crash recovery, the system can iterate through each slab and determine, based on the stored associations, the slab's object type. The system can then scan though the allocated objects in the slab and, if the system determines that the object includes any pointers based on the stored pointer location information, can swizzle each pointer.

The following detailed description and accompanying drawings provide a better understanding of the nature and advantages of particular embodiments.

DETAILED DESCRIPTION

Figure 1:
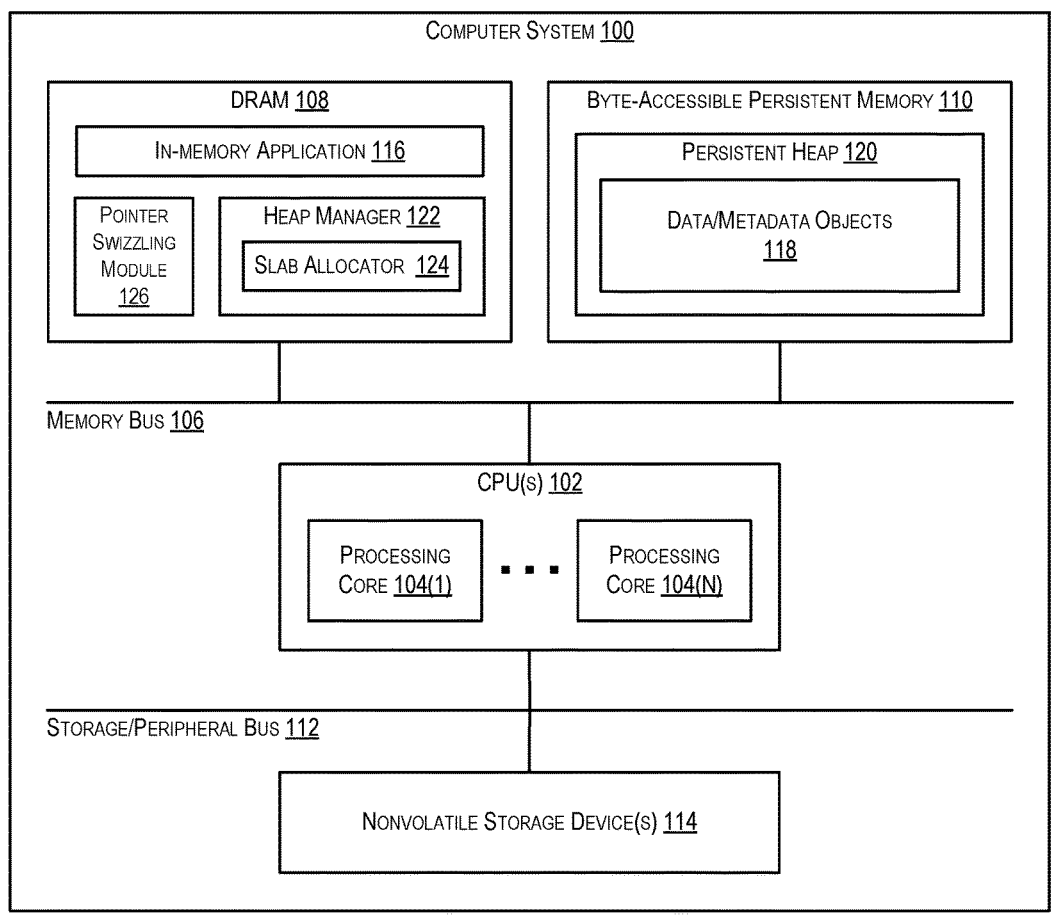
FIG. 1 depicts a computer system in which embodiments of the present disclosure may be implemented.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for efficiently identifying and swizzling memory pointers that are included in objects stored in a persistent heap (i.e., a memory pool maintained on a persistent memory medium, such as byte-addressable persistent memory). Such objects are referred to herein as persistent objects. These techniques rely on the heuristic that pointers which needed to be swizzled typically reside in fixed-size objects (e.g., hash table entries, linked list entries, etc.) rather than variable-length objects (e.g., keys, values, etc.).

According to one set of embodiments, a computer system can pre-allocate space in the persistent heap in the form of contiguous memory segments known as slabs. Each slab can be configured to hold instances of a single fixed-size object type used by an application. For example, if the application uses fixed-size object types O1, O2, and O3, the computer system can pre-allocate one or more slabs S1 to hold instances of O1, one or more slabs S2 to hold instances of O2, and one or more slabs S3 to hold instances of O3. As part of this process, the computer system can store information regarding the object type associated with each slab, as well as the locations (e.g., fields or offsets) where pointers reside in the object data structure. When the application issues a request to allocate memory for a particular fixed-size object instance (e.g., an instance of O1), the computer system can fulfill the request by assigning a free slot in the appropriate slab (e.g., S1) to the object instance, thereby causing that instance to occupy that slot of the slab.

Then, at the time of a system restart or crash recovery, the computer system can iterate through all of the slabs allocated in the persistent heap and, for each slab, can sequentially scan through the slots of the slab. For each scanned slot, the computer system can examine the field(s) or offset(s) where pointers are expected to reside (per the information stored during the slab pre-allocation phase). The computer system can then update (i.e., swizzle) the pointers found at those fields/offsets. For example, in the scenario where the persistent heap has been remapped from an old base virtual address to a new base virtual address, this swizzling can comprise subtracting the old base virtual address from the new base virtual address and adding the resulting value to the virtual address included in the pointer. Once all of the slabs have been scanned, the computer system can resume execution of the application.

With the approach above, a number of benefits can be realized. First, since the pointer identification and swizzling occurs entirely during the system initialization phase after a restart/failure, there is no computational overhead during the runtime of the application and all of the swizzling code can be confined to the system restart/recovery codebase. This reduces the load on the system and allows this solution to be easily applied to different applications.

Second, there is very little storage overhead—the computer system need only store information regarding the object type associated with each slab and the pointer fields or offsets within each object type. Note that the size of this information is independent of the volume of actual data or metadata generated or used by the application.

Third, this approach exhibits good data locality due to the sequential scanning of slabs, each of which is allocated using a continuous segment of memory. This allows for superior performance over alternative approaches that may require non-sequential memory accesses in order to identify and swizzle all of the pointers in the system.

The foregoing and other aspects of the present disclosure are described in further detail in the sections that follow.

2. System Architecture

FIG. 1 is a simplified block diagram of a computer system 100 that may be used to implement embodiments of the present disclosure. As shown, computer system 100 includes one or more central processing units (CPUs) 102 that comprise a number of processing cores 104(1)-104(N). CPU(s) 102 are connected, via a memory bus 106, to DRAM 108 and byte-addressable persistent memory (e.g., PCM, NVDIMM, etc.) 110. As mentioned previously, byte-addressable persistent memory 110 is a type of random access memory that allows fast, byte-level access to data in a manner similar to DRAM, but is nonvolatile in nature. In addition to memories 108 and 110, CPU(s) 102 are connected, via a storage or peripheral bus 112, to one or more nonvolatile storage devices (e.g., magnetic hard disks or solid-state disks (SSDs)) 114.

CPU(s) 102 are configured to execute an in-memory application 116, which is shown as running from DRAM 108. In-memory application 116 is a software component that stores some, or all, of its data and metadata in random access memory (rather than on nonvolatile storage) for fast manipulation and access to that data/metadata. Examples of in-memory applications include, e.g., in-memory databases, in-memory key-value stores, and the like. In the example of FIG. 1, the data and metadata of in-memory application 116 is shown as residing (in the form of data/metadata objects 118) in a persistent heap 120 stored on byte-addressable persistent memory 110. In certain embodiments, some portion of this data/metadata may also reside in another memory location, such as in DRAM 108.

CPU(s) 102 are also configured to execute a heap manager 122, which is shown as running from DRAM 108. Heap manager 122 is a software component that is responsible for managing persistent heap 120 on behalf of in-memory application 116. For instance, at the time of application initialization, persistent heap 120 (or a portion thereof) can be mapped to a virtual memory address range assigned to in-memory application 116. Then, during runtime, in-memory application 116 can issue requests to heap manager 122 in order to, e.g., allocate space in persistent heap 120 for storing one or more of data/metadata objects 118, initializing the objects, and freeing the allocated space when the objects are no longer in use. In certain embodiments, heap manager 122 may also be responsible for managing other persistent or non-persistent heaps used within computer system 100.

As noted in the Background section, in some cases, persistent heap 120 may be remapped from one base virtual address to another base virtual address within the virtual memory space of in-memory application 116 after a system restart or failure. This may be due to, e.g., security mechanisms such as address space layout randomization (ASLR) which randomize the locations where applications are loaded into memory, or other factors that affect the virtual memory layout of the system. The result of this change is that any absolute pointers (i.e., pointers that reference absolute virtual memory addresses) included in persisted data/metadata objects 118 will be rendered invalid once computer system 100 is rebooted or application 116 is restarted. Thus, these pointers must be updated, or swizzled, during the system restart/recovery process to ensure that they can be correctly de-referenced at application runtime.

There are a number of existing approaches for identifying and swizzling pointers in this type of scenario. For example, according to one approach (known as the "pointer traversal" approach), the computer system can maintain knowledge about the object types used by an application, the structures of the objects (e.g., which object fields contain pointers), how to traverse from one object to another (i.e., a traversal function), and a deterministic traversal schedule. Upon system or application restart/recovery, the computer system can use this knowledge to traverse the application's data/metadata objects and swizzle the pointers that are encountered in each object. The problem with this approach is that it is application-specific and fairly fragile. For example, if one pointer of the application becomes corrupted (due to, e.g., software bugs or hardware failure), the entire swizzling process can be adversely affected.

According to another approach (known as the "object table" approach), the computer system can record object-level information in a table each time an object is allocated from the persistent heap. The object-level information can include the object type and a self-relative object address (e.g., an offset in the heap). The computer system can then traverse the object table at the time of system restart/recovery and can swizzle the pointers in each object. While this approach does not need the same degree of application-specific knowledge as the pointer traversal approach, it requires extra storage for storing the object table, which will increase in size as the data size of the system grows. In addition, this approach incurs significant overhead in object allocation and deallocation during application runtime in order to record and remove object-level information from the table.

According to yet another approach (known as the "pointer table" method), the computer system can record pointer-level information in a table each time an object is allocated from the persistent heap. The pointer-level information can include a self-relative address for each pointer included in the object. The computer system can then traverse the pointer table at the time of system restart/recovery and can swizzle each pointer in the table. Like the object table approach, this approach is more application-agnostic than the pointer traversal approach, but incurs a storage overhead that grows with the data size of the system, as well as a runtime overhead during object allocation and deallocation in order to record and remove pointer-level information from the table.

To address the foregoing and other similar limitations, computer system 100 of FIG. 1 includes a novel slab allocator 124 (within heap manager 122) and a novel pointer swizzling module 126. Slab allocator 124, which is responsible for allocating and freeing space in persistent heap 120, is similar in certain respects to conventional slab allocators known in the art. For example, slab allocator 124 can organize persistent heap 120 into a number of pre-allocated, contiguous memory segments, or slabs, each of which is configured to hold instances of a single fixed-size object type (e.g., hash table entry, linked list entry, etc.) used by a heap consumer such as in-memory application 116.

However, unlike conventional slab allocators, slab allocator 124 can also keep track of the object type associated with each slab, as well as the locations (e.g., fields or offsets) of pointers in each object type. For instance, if slab S1 is configured to hold instances of object type O1, slab allocator 124 can maintain a record of this association between S1 and O1. Further, if object type O1 includes a pointer at byte offset X, slab allocator 124 can maintain a record of this pointer location information for O1. Both the slab-object type associations and object type pointer information can be stored in byte-addressable memory 110 or another nonvolatile medium, such as nonvolatile storage device(s) 114. It should be noted that the object type information and pointer locations for each object type will generally be determined during application development time, and will only be changed when the application updates its object types and/or layouts.

Then, at the time of a system and application restart or crash recovery, pointer swizzling module 126 can traverse the slabs in persistent heap 120 and, for each slab: (1) determine the object type associated with the slab (per the slab-object type associations noted above), (2) determine the locations of pointers in the object type (per the object type pointer location information noted above), and (3) sequentially scan each allocated slot/object in the slab at the determined pointer locations/offsets to find and swizzle the object's pointers. In this way, pointer swizzling module 126 can quickly identify and swizzle all of the fixed-size pointers in persistent heap 120, without requiring detailed application-specific knowledge (as in the pointer traversal approach) or incurring a large storage overhead (as in the object table and pointer table approaches). Further, unlike the object table and pointer table approaches, this slab-based approach incurs relatively little overhead during the runtime of the application (e.g., overhead is only incurred per slab allocation and free, and not per object allocation and free). Additional details regarding the operation of slab allocator 124 and pointer swizzling module 126 are provided below.

It should be appreciated that computer system 100 of FIG. 1 is illustrative and not intended to limit embodiments of the present disclosure. For example, the various components shown in computer system 100 can be arranged according to different configurations and/or include subcomponents or functions that are not specifically described. One of ordinary skill in the art will recognize many variations, modifications, and alternatives.

3. Slab Allocator Workflow

Figure 2:
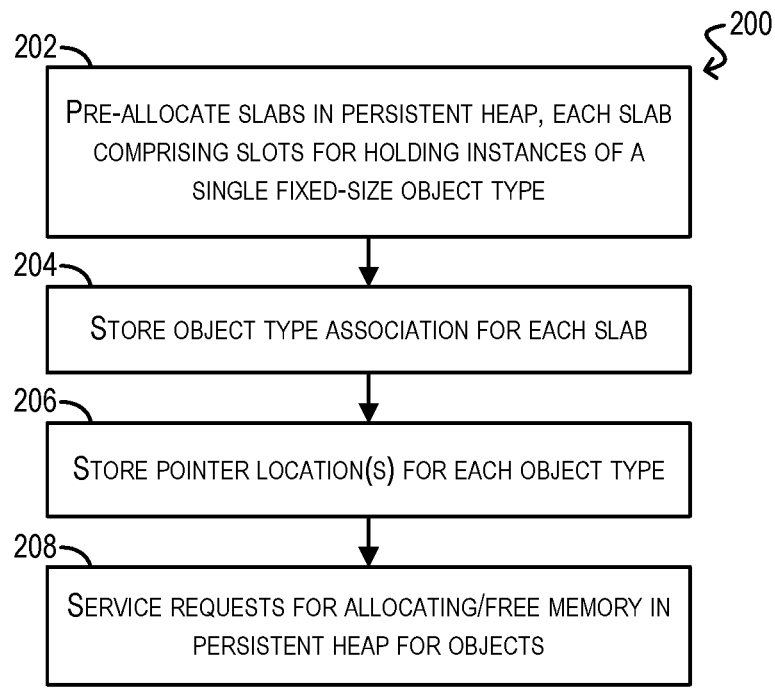
FIG. 2 depicts a slab allocator workflow according to an embodiment.

FIG. 2 depicts a workflow 200 that can be executed by slab allocator 124 of FIG. 1 during runtime of in-memory application 116 in order to support the pointer swizzling techniques of the present disclosure according to an embodiment. This workflow assumes that persistent heap 120 is associated with in-memory application 116 and is mapped to a virtual memory address space of application 116.

Starting with block 202, slab allocator 124 can pre-allocate one or more slabs in persistent heap 120, where each slab comprises a number of slots that are configured to hold instances of a single fixed-size object type used by in-memory application 116. As mentioned previously, each slab corresponds to a contiguous segment of memory within heap 120.

At block 204, slab allocator 124 can store information regarding the object type associated with each allocated slab (referred to herein as a "slab-object type association"). For example, if slab S1 is configured to hold instances of object type O1, slab allocator 124 can store an association between S1 and O1. Similarly, if slab S2 is configured to hold instances of object type O2, slab allocator 124 can store an association between S2 and O2. In one embodiment, slab allocator 124 can store this information in a metadata field within each slab. In other embodiments, slab allocator 124 can store this information in a central table on, e.g., byte-addressable persistent memory 110 or nonvolatile storage device(s) 114.

At block 206, slab allocator 124 can store information regarding the locations (e.g., fields or offsets) of any pointers in each object type. For example, if object type O1 includes two pointers at byte offsets X and Y, slab allocator 124 can store an association between these pointer offset locations and O1. Like the slab-object type associations, slab allocator 124 can store this object type pointer location information in persistent memory 110 or nonvolatile storage 114.

Finally, at block 208, slab allocator 124 can service requests from in-memory application 116 for allocating/freeing memory in persistent heap 120 for data/metadata objects 118, per slab allocator 124's conventional operation. For example, when application 116 submits a request to allocate memory for a particular fixed-size object instance, slab allocator 124 can satisfy the request with a pre-allocated slot in an appropriate slab. Further, when a request is received from in-memory application 116 to free the memory allocated to an existing object, slab allocator 124 can mark the slot occupied by that object as being freed (without actually destroying the object or freeing the underlying memory). In the case that all of the objects for a given slab are freed or relocated to other slabs, that slab can be deallocated from the persistent heap.

4. Pointer Identification/Swizzling Workflow

Figure 3:
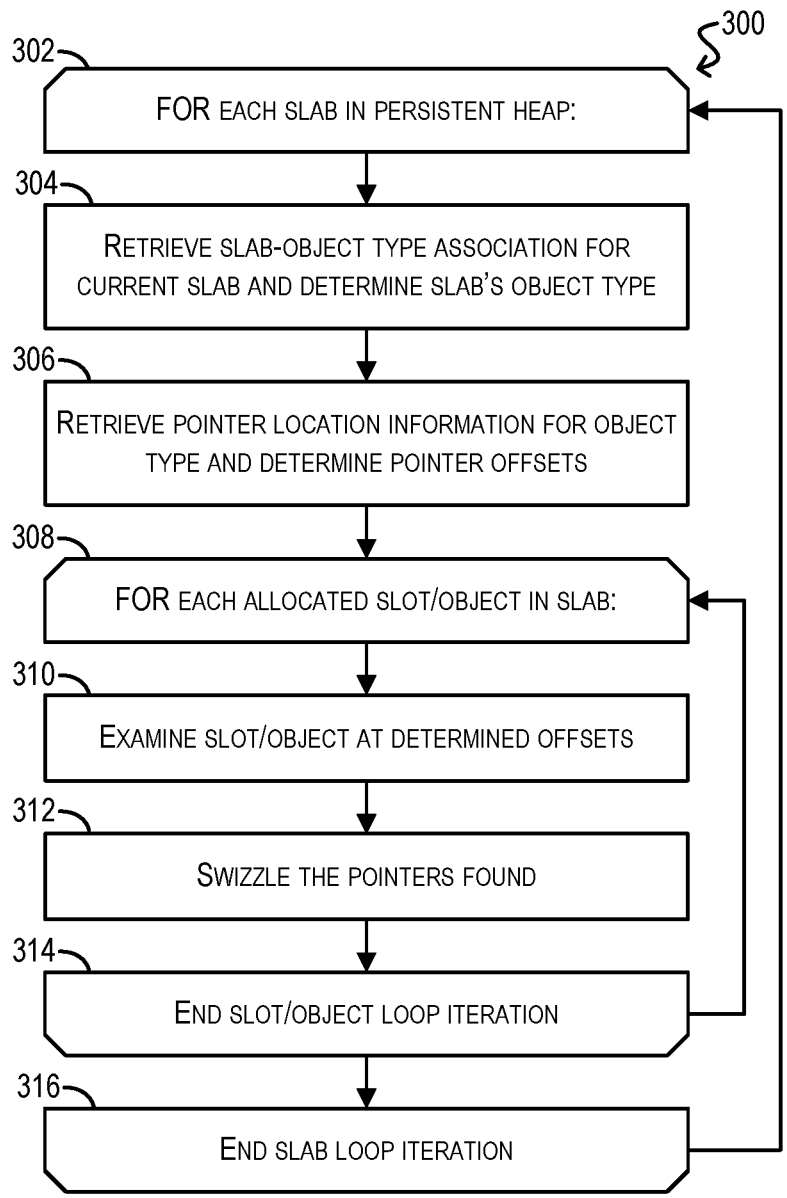
FIG. 3 depicts a pointer swizzling workflow according to an embodiment.

FIG. 3 depicts a workflow 300 can be executed by pointer swizzling module 126 of FIG. 1 during a restart/crash recovery phase of computer system 100 in order to identify and swizzle all of the pointers included in fixed-size objects in persistent heap 120 according to an embodiment. This workflow is needed in scenarios where the virtual memory addresses contained in the pointers are no longer valid after the system restart (due to, e.g., a change in the base virtual address of persistent heap 120). Workflow 300 assumes that the fixed-size objects are allocated within slabs in heap 120 per workflow 200 of FIG. 2. Workflow 300 further assumes that (1) the previous base virtual memory address for the persistent heap is saved (either in byte-addressable persistent memory 110 or nonvolatile storage device(s) 114), and (2) the virtual memory addresses included in the pointers are absolute, rather than relative, addresses.

Starting with block 302, pointer swizzling module 126 can enter a loop for each slab allocated in persistent heap 120. Within this loop, pointer swizzling module 126 can retrieve the slab-object type association stored for the current slab and, based on this information, determine the slab's object type (block 304). Further, pointer swizzling module 126 can retrieve the pointer location information stored for the object type determined at block 204 and, based on this information, determine the location(s) of any pointers in the object type (block 306).

Then, at block 308, pointer swizzling module 126 can enter a loop for each allocated slot/object in the current slab. Within this second loop, pointer swizzling module 126 can examine the slot/object at the pointer location(s) determined at block 306 and check whether any pointers exist at those location(s) (block 310). If any pointers are found, pointer swizzling module 126 can swizzle the pointer(s) as appropriate (block 312). In one embodiment, this swizzling operation can involve subtracting the previous (i.e., old) base virtual address assigned to persistent heap 120 prior to the system restart or failure from the current (i.e, new) base virtual address assigned to persistent heap 120. Pointer swizzling module 126 can then add this value to the virtual address stored in each pointer.

At block 314, the loop iteration for the current slot/object can end and pointer swizzling module 126 can repeat this loop for each remaining allocated slot/object in the current slab until all of the slots/objects have been processed. Further, at block 316, the loop iteration for the current slab can end and pointer swizzling module 126 can repeat this loop for each remaining slab in persistent heap 120 until all of the slabs have been processed. Finally, at the conclusion of this outer loop, workflow 300 can end since all pointers have been identified and swizzled.

It should be noted that the slab-based approach described with respect to FIGS. 2 and 3 can be used for swizzling both intra-heap pointers (i.e., pointers from one object to another object within the same persistent heap) and inter-heap pointers (i.e., pointers from one persistent heap to another). This approach is less appropriate for volatile-to-persistent pointers (i.e., pointers from a volatile heap or stack to a persistent heap), which should generally be reinitialized by an application at the time of each system restart or crash recovery, and for persistent-to-volatile pointers (i.e., pointers from a persistent heap to a volatile heap or stack), which should generally be avoided since they are error-prone and difficult to debug.

5. Crash Consistency During Swizzling

To ensure crash consistency during the pointer identification/swizzling workflow of FIG. 3, in certain embodiments computer system 100 can maintain a progress table (either in byte-addressable persistent memory 110 or non-volatile storage 114) that records (1) the number of objects that have been processed (i.e., swizzled) and (2) the base virtual address of the persistent heap used to swizzle the pointers of those objects. This can involve, e.g., atomically swizzling each pointer per block 312 of workflow 300 and updating a sequential index or counter of the objects that have been swizzled. If the system crashes before workflow 300 is completed, pointer swizzling module 126 can restart the workflow from the beginning. However, for the object indices that are identified in the progress table, module 126 can re-swizzle the pointers in those objects using the base virtual address recorded in the progress table.

For example, assume that there are N total objects in persistent heap 120 and that the original base address of heap 120 is Address #0. Further assume that the following sequence of events occurs: (1) the system restarts, causing the new base address of heap 120 to become Address #1; (2) pointer swizzling module 126 executes workflow 300 and processes objects 0 to N1 (where N1<N); and (3) the system crashes immediately after object N1 is processed. After (3), assume the system restarts again and the new base address of heap 120 becomes Address #2.

In this scenario, the progress table will store N1 (i.e., the number of objects processed before the crash) and Address #1 (i.e., the base virtual address used for swizzling objects 0-N1). Then, upon running workflow 300 a second time, pointer swizzling module 126 will reswizzle the pointers of objects 0 to N1 based on the value of Address #2−Address #1, and swizzle the pointers of objects N1+1 to N based on the value of Address #2−Address #0. Note that the progress of this second pointer swizzling run will also be tracked in the progress table in case the system crashes again before it can be completed.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for efficiently swizzling pointers in persistent objects, the method comprising:
    allocating, by a computer system, one or more slabs in a persistent heap, wherein the persistent heap resides on a byte-addressable persistent memory of the computer system, and wherein each of the one or more slabs is a continuous memory segment of the persistent heap comprising a plurality of slots, each slot being configured to store an instance of a fixed-size object type used by an application;
    storing, by the computer system, associations between the one or more slabs and their respective fixed-size object types;
    storing, by the computer system, pointer location information indicating, for each fixed-size object type used by the application, fields or offsets within the fixed-size object type where one or more absolute pointers may be stored; and
    at a time of a restart or crash recovery of the computer system:
        iterating through each slab in the one or more slabs;
        determining, based on the stored associations, the slab's fixed-size object type; and
        for each slot in the slab:
            determining, based on the stored pointer location information, whether an object stored in the slot includes any pointers; and
            if the object does include any pointers, swizzling each pointer by:
                determining an old base virtual address previously assigned to the persistent heap prior to the restart or crash recovery;
                determining a new base virtual address currently assigned to the persistent heap after the restart or crash recovery;
                subtracting the old base virtual address from the new base virtual address to generate a result value; and
                adding the result value to a virtual address stored in the pointer.

2. The method of claim 1 wherein determining whether the object includes any pointers comprises examining the object at the fields or offsets indicated in the pointer location information stored for the fixed-size object type corresponding to the object.

3. The method of claim 1 wherein the application is an in-memory database or in-memory key-value store.

4. The method of claim 1 wherein the associations and the pointer location information are stored in the byte-addressable persistent memory.

5. The method of claim 1 further comprising:
    maintaining a progress table while iterating through each slab in the one or more slabs, the progress table recording objects whose pointers have been swizzled and a current base virtual address of the persistent heap; and
    in case of a crash during the iterating, re-swizzling the pointers of the objects recorded in the progress table using the base virtual address recorded in the progress table.

6. The method of claim 1 wherein the associations and pointer location information for each slab are stored in a metadata field of the slab.

7. The method of claim 1 further comprising, prior to the restart or crash recovery of the computer system:
    saving the old base virtual address for the persistent heap in the byte-addressable persistent memory.

8. A non-transitory computer readable storage medium having stored thereon program code executable by a computer system, the program code embodying a method for efficiently swizzling pointers in persistent objects, the method comprising:
    allocating one or more slabs in a persistent heap, wherein the persistent heap resides on a byte-addressable persistent memory of the computer system, and wherein each of the one or more slabs is a continuous memory segment of the persistent heap comprising a plurality of slots, each slot being configured to store an instance of a fixed-size object type used by an application;
    storing associations between the one or more slabs and their respective fixed-size object types;
    storing pointer location information indicating, for each fixed-size object type used by the application, fields or offsets within the fixed-size object type where one or more absolute pointers may be stored; and
    at a time of a restart or crash recovery of the computer system:
        iterating through each slab in the one or more slabs;
        determining, based on the stored associations, the slab's fixed-size object type; and
        for each slot in the slab:
            determining, based on the stored pointer location information, whether an object stored in the slot includes any pointers; and
            if the object does include any pointers, swizzling each pointer by:
                determining an old base virtual address previously assigned to the persistent heap prior to the restart or crash recovery;
                determining a new base virtual address currently assigned to the persistent heap after the restart or crash recovery;
                subtracting the old base virtual address from the new base virtual address to generate a result value; and
                adding the result value to a virtual address stored in the pointer.

9. The non-transitory computer readable storage medium of claim 8 wherein determining whether the object includes any pointers comprises examining the object at the fields or offsets indicated in the pointer location information stored for the fixed-size object type corresponding to the object.

10. The non-transitory computer readable storage medium of claim 8 wherein the application is an in-memory database or in-memory key-value store.

11. The non-transitory computer readable storage medium of claim 8 wherein the associations and the pointer location information are stored in the byte-addressable persistent memory.

12. The non-transitory computer readable storage medium of claim 8 wherein the method further comprises:
   maintaining a progress table while iterating through each slab in the one or more slabs, the progress table recording objects whose pointers have been swizzled and a current base virtual address of the persistent heap; and
   in case of a crash during the iterating, re-swizzling the pointers of the objects recorded in the progress table using the base virtual address recorded in the progress table.

13. The non-transitory computer readable storage medium of claim 8 wherein the associations and pointer location information for each slab are stored in a metadata field of the slab.

14. The non-transitory computer readable storage medium of claim 8 wherein the method further comprises, prior to the restart or crash recovery of the computer system:
   saving the old base virtual address for the persistent heap in the byte-addressable persistent memory.

15. A computer system comprising:
   a processor;
   a byte-addressable persistent memory; and
   a non-transitory computer readable medium having stored thereon program code for efficiently swizzling pointers in persistent objects, the program code causing the processor to:
      allocate one or more slabs in a persistent heap, wherein the persistent heap resides on the byte-addressable persistent memory, and wherein each of the one or more slabs is a continuous memory segment of the persistent heap comprising a plurality of slots, each slot being to store an instance of fixed-size object type used by an application;
      store associations between the one or more slabs and their respective fixed-size object types;
      store pointer location information indicating, for each fixed-size object type used by the application, fields or offsets within the fixed-size object type where one or more absolute pointers may be stored; and
      at a time of a restart or crash recovery of the computer system:
         iterate through each slab in the one or more slabs;
         determine, based on the stored associations, the slab's fixed-size object type; and
         for each slot in the slab:
            determine, based on the stored pointer location information, whether an object stored in the slot includes any pointers; and
            if the object does include any pointers, swizzle each pointer by:
               determining an old base virtual address previously assigned to the persistent heap prior to the restart or crash recovery;
               determining a new base virtual address currently assigned to the persistent heap after the restart or crash recovery;
               subtracting the old base virtual address from the new base virtual address to generate a result value; and
               adding the result value to a virtual address stored in the pointer.

16. The computer system of claim 15 wherein the program code that causes the processor to determine whether the object includes any pointers comprises program code that causes the processor to examine the object at the one or more fields or offsets indicated in the pointer location information stored for the fixed-size object type corresponding to the object.

17. The computer system of claim 15 wherein the application is an in-memory database or in-memory key-value store.

18. The computer system of claim 15 wherein the associations and the pointer location information are stored in the byte-addressable persistent memory.

19. The computer system of claim 15 wherein the program code further causes the processor to:
   maintain a progress table while iterating through each slab in the one or more slabs, the progress table recording objects whose pointers have been swizzled and a current base virtual address of the persistent heap; and
   in case of a crash during the iterating, re-swizzle the pointers of the objects recorded in the progress table using the base virtual address recorded in the progress table.

20. The computer system of claim 15 wherein the associations and pointer location information for each slab are stored in a metadata field of the slab.

21. The computer system of claim 15 wherein the program code further causes the processor to, prior to the restart or crash recovery of the computer system:
   save the old base virtual address for the persistent heap in the byte-addressable persistent memory.

* * * * *